(12) United States Patent
Beltran et al.

(10) Patent No.: US 10,857,742 B2
(45) Date of Patent: Dec. 8, 2020

(54) METHOD AND APPARATUS FOR MANUFACTURING DRY LINERS FOR PIPE REPAIR

(71) Applicant: OCV Intellectual Capital, LLC, Toledo, OH (US)

(72) Inventors: Antoni Serarols Beltran, Suria (ES); Corneilis Den Besten, Elburg (NL)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 16/343,872

(22) PCT Filed: Sep. 26, 2017

(86) PCT No.: PCT/US2017/053374
§ 371 (c)(1),
(2) Date: Apr. 22, 2019

(87) PCT Pub. No.: WO2018/080689
PCT Pub. Date: May 3, 2018

(65) Prior Publication Data
US 2019/0263075 A1 Aug. 29, 2019

(30) Foreign Application Priority Data
Oct. 31, 2016 (EP) ..................................... 16382498

(51) Int. Cl.
*B29C 70/16* (2006.01)
*B29C 70/54* (2006.01)
(Continued)

(52) U.S. Cl.
CPC .............. *B29C 70/16* (2013.01); *B29C 53/48* (2013.01); *B29C 70/228* (2013.01);
(Continued)

(58) Field of Classification Search
CPC ......... B29C 53/38; B29C 53/48; B29C 53/54; B29C 63/34; B29C 63/341; B29C 63/36;
(Continued)

(56) References Cited

U.S. PATENT DOCUMENTS 3,250,655 A * 5/1966 Solomon ............. B32B 38/1816
156/181
4,986,951 A 1/1991 Ledoux et al.
(Continued)

FOREIGN PATENT DOCUMENTS

EP 2357065 A1 8/2011
GB 2031044 A 4/1980
(Continued)

OTHER PUBLICATIONS

Extended European Search Report from EP Application No. 16382498.0 dated Apr. 6, 2017.
(Continued)

*Primary Examiner* — Michael A Tolin
(74) *Attorney, Agent, or Firm* — Calfee, Halter & Griswold LLP (57) ABSTRACT

A method of manufacturing a liner for reinforcing a pipe includes providing a continuous first reinforcing fibers extending in a first direction, moving the first reinforcing fibers in a machine direction such that the first direction is parallel to the machine direction, providing sheets of a material having second reinforcing fibers extending in a second direction, placing the sheets onto the moving first reinforcing fibers such that the second direction is substantially perpendicular to the first direction, and folding the sheets into a closed shape.

22 Claims, 5 Drawing Sheets

(51) Int. Cl.
- *B29C 53/48* (2006.01)
- *F16L 55/165* (2006.01)
- *B29C 70/22* (2006.01)
- *B29L 23/00* (2006.01)
- *B29C 63/34* (2006.01)
- *B29K 309/08* (2006.01)

(52) U.S. Cl.
CPC ........ *B29C 70/545* (2013.01); *F16L 55/1656* (2013.01); *B29C 63/34* (2013.01); *B29K 2309/08* (2013.01); *B29L 2023/006* (2013.01)

(58) Field of Classification Search
CPC ....... B29C 70/16; B29C 70/20; B29C 70/202; B29C 70/22; B29C 70/228; B29C 70/545; B29C 73/04; B29D 23/001; B29L 2023/006; F16L 55/1651; F16L 55/1654; F16L 55/1656

See application file for complete search history.

(56) References Cited

U.S. PATENT DOCUMENTS

| | | | |
|---|---|---|---|
| 5,868,169 A * | 2/1999 | Catallo | F16L 58/02 138/124 |
| 6,196,271 B1 * | 3/2001 | Braun | F16L 55/1654 138/97 |
| 7,258,141 B2 | 8/2007 | Catha et al. | |
| 7,374,127 B2 | 5/2008 | Gallagher et al. | |
| 7,857,932 B1 | 12/2010 | Driver et al. | |
| 8,131,395 B2 | 3/2012 | Johnson et al. | |
| 2002/0124936 A1 | 9/2002 | Loubinoux | |
| 2003/0113489 A1 | 6/2003 | Smith | |
| 2004/0082244 A1 | 4/2004 | Loubinoux | |
| 2006/0151656 A1 | 7/2006 | Gallagher et al. | |
| 2008/0124993 A1 | 5/2008 | Brady | |
| 2015/0246501 A1 | 9/2015 | Den Besten et al. | |

FOREIGN PATENT DOCUMENTS

| | | |
|---|---|---|
| NL | 7211456 A | 5/1973 |
| WO | 9412339 A1 | 6/1994 |
| WO | WO-0222347 A1 * | 3/2002 |
| WO | 2011013823 A1 | 2/2011 |

OTHER PUBLICATIONS

International Search Report and Written Opinion from PCT/US2017/053374 dated Dec. 8, 2017.

* cited by examiner

METHOD AND APPARATUS FOR MANUFACTURING DRY LINERS FOR PIPE REPAIR

RELATED APPLICATIONS

This application is the U.S. national stage entry of PCT/US2017/053374, filed on Sep. 26, 2017, which claims priority to and all benefit of European Patent Application Serial No. 16382498.0, filed on Oct. 31, 2016 and titled METHOD AND APPARATUS FOR MANUFACTURING DRY LINERS FOR PIPE REPAIR, the entire disclosures of which are fully incorporated herein by reference.

FIELD

The present application relates to liners for rehabilitating damaged or deteriorated piping systems and to methods of manufacturing such liners.

BACKGROUND

Underground piping systems are essential for transporting liquids and gases to homes and businesses. Utilities typically use these piping systems for sewer, water, gas, and other applications. Such piping systems are installed several feet underground and access to the piping systems is therefore limited.

Underground pipes experience cyclical loading, premature wear, corrosion, porosity, and ambient foundation or earth movements. As a result, pipes may develop damaged or weakened areas that require repair. To maintain the service afforded by the underground piping system, any cracks or leaks must be promptly detected and repaired. Repair of a small section of the pipe by welding, patching, or otherwise is usually unsatisfactory and difficult because the pipe diameter does not allow human access in safe conditions. Likewise, digging up and replacing a section of pipe is difficult, expensive, and time consuming.

A solution for the repair of underground pipes is to repair a pipe while it is still in place. Some in-situ pipe repair procedures include the insertion of a pliable reinforcement liner into the damaged pipe. There are several types of reinforcement or reinforcing liners. Some reinforcement liners include glass fibers for support and strength.

The liner may be installed into the damaged pipe from one point of entry to another by one of several known techniques. The liner typically has an outer diameter which is substantially the same as the inner diameter of the damaged pipe. The liner is pressurized so that it presses firmly along the inner wall of the damaged pipe. The expanded liner is then cured to form a new, rigid lining or surface within the original pipe. Liners that are hardened or cured after they have been installed are referred to as "cured-in-place pipe (CIPP)" liners. The resin may be cured by one of several known techniques, including UV curing.

Figure 1:
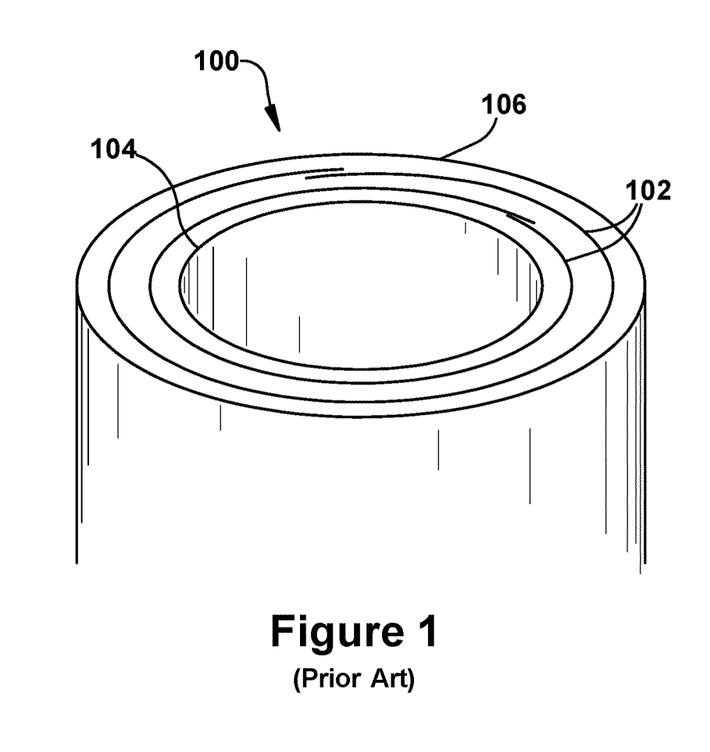
FIG. 1 is a cross-sectional, perspective view of a conventional CIPP liner formed by a folding process.

Production methodologies for producing CIPP glass liners include a folding process. As shown in FIG. 1, in a conventional folding process, a liner 100 includes multiple layers of fabric 102, such as for example, woven roving mat fabrics, that are folded together with an overlap of several centimeters per layer around an inner tubular film 104, such as for example, a styrene tight tubular film. The liner 100 is then wrapped in an outer film 106, such as for example, a joint welded outer film. The number of fabric layers 102 depends on the required wall thickness. The liner 100 is also impregnated with a resin. To prevent premature curing of the resin, the impregnated liner is shielded from daylight/UV light if resin being used is UV light curable or is shielded from high temperatures if the resin used is hot curable.

Since the liner 100 has an outer diameter which is substantially the same as the inner diameter of the damaged pipe, the width of the fabric layers 102 must be customized for the diameter of pipe being repaired. Thus, liner manufacturers typically stock fabric layers with numerous different widths in order to produce liners for different diameter pipes.

SUMMARY

The present application describes a method and apparatus for manufacturing a liner for reinforcing a pipe.

In an exemplary embodiment, the method includes providing a plurality of continuous first reinforcing fibers extending in a first direction, moving the first reinforcing fibers in a machine direction such that the first direction is parallel to the machine direction, providing a plurality of sheets of a material having second reinforcing fibers extending in a second direction, placing the plurality of sheets onto the moving first reinforcing fibers such that the second direction is substantially perpendicular to the first direction, and folding the plurality of sheets into a closed shape.

The method and apparatus for manufacturing may be used to make pipe-reinforcing liners having different diameters. In an exemplary embodiment, the method includes forming a first liner having a first diameter by providing a layer of continuous first reinforcing fibers extending in a first direction, moving the first reinforcing fibers in a machine direction such that the first direction is parallel to the machine direction, providing a supply of continuous material having second reinforcing fibers extending in a second direction, the continuous material having a first width, cutting a plurality of generally equal length, discrete sheets of the continuous material, the discrete sheets having a first length, placing the plurality of sheets onto the moving first reinforcing fibers such that the second direction is substantially perpendicular to the first direction, wherein each of the plurality of sheets partially overlaps one or more adjacent sheets of the plurality of sheets, and folding the plurality of sheets into a closed shape to form a first liner having a first diameter. A second liner having a second diameter may be formed by providing a layer of continuous first reinforcing fibers extending in a first direction, moving the first reinforcing fibers in a machine direction such that the first direction is parallel to the machine direction, providing a supply of continuous material having second reinforcing fibers extending in a second direction, the continuous material having the first width, cutting a plurality of generally equal length, discrete sheets of the continuous material, the discrete sheets having a second length different than the first length, placing the plurality of sheets onto the moving first reinforcing fibers such that the second direction is substantially perpendicular to the first direction, and folding the plurality of sheets into a closed shape to form a first liner having a second diameter.

Further features and advantages of the invention will become apparent from the following detailed description made with reference to the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

The present application describes various exemplary methods and apparatus for forming a repair liner for reinforcing a pipe. In an exemplary embodiment, the method utilizes a modified folding process in which a single width reinforcing fabric can be used to manufacture liners with different diameters.

Figure 2:
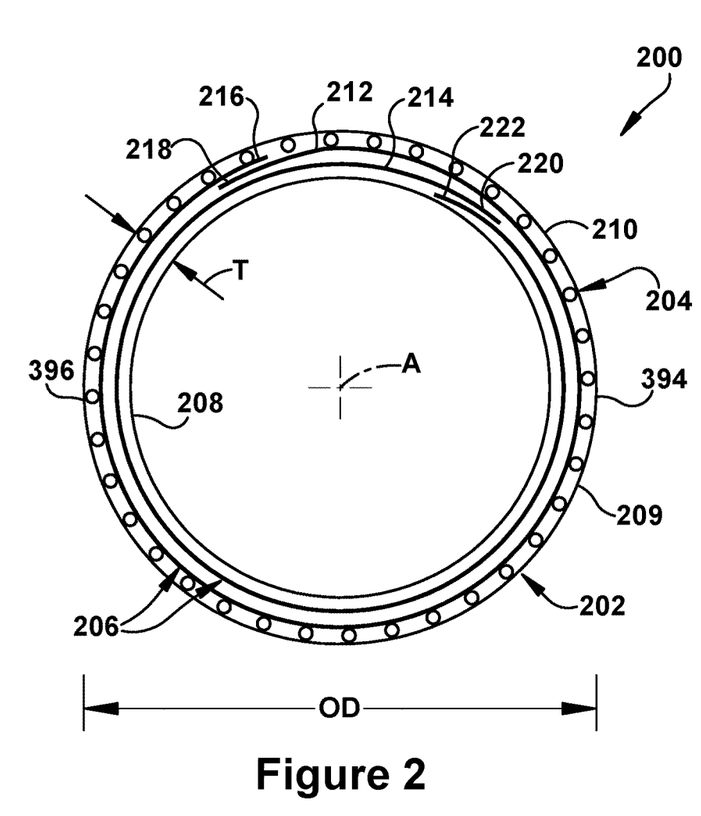
FIG. 2 is a cross-sectional view of an exemplary embodiment of a CIPP liner.

FIG. 2 illustrates a cross-section of an exemplary embodiment of a liner 200 for rehabilitating a pipe. The liner 200 may be configured in a variety of ways. For example, different embodiments may include different materials, have different diameters and thicknesses, and vary in the number of materials and number of layers used. In the exemplary embodiment of FIG. 2, the liner 200 is illustrated as having an annular cross-section with an outer diameter OD and a thickness T. The liner 200, however, is flexible prior to curing; thus, the liner 200 may be folded generally flat for storage or collapsed to a smaller cross-section for insertion into a pipe. In addition, the outer diameter OD of the liner 200 may be expanded after insertion into a pipe.

In the exemplary embodiment, the liner 200 includes a layer of outer foil 202, one or more layers of a first reinforcing material 204, a plurality of layers of a second reinforcing material 206, and a layer of inner foil 208.

The outer foil layer 202 is configured to hold the first reinforcing material in place relative to the second reinforcing material and prevent leakage of resin after the liner 200 has been impregnated. The outer foil layer 202 may also provide shield the resin from daylight/UV light to prevent a UV light curable resin from prematurely curing. The outer foil layer 202 may be configured in a variety of ways. For example, the type of and number of materials used for the outer foil layer 202 may vary for different embodiments of the liner 200. Any material capable of holding the first reinforcing material in place relative to the second reinforcing material and preventing leakage of resin may be used. Suitable materials for the outer foil layer 202 include, but are not limited to, one or more of a polyamide, polypropylene, polyethylene, polyurethane, or polyester. In the exemplary embodiment, the outer foil layer 202 includes a polyamide layer to act as a styrene barrier and a polyethylene layer to improve the ability to weld the outer foil layer 202.

As illustrated, the outer foil layer 202 has a first half 209 and a second half 210 opposite the first half. The first half 209 and the second half 210 are joined together along their respective edges to form a closed shape, such as a tube. The first half 209 and the second half 210 may be joined in any suitable manner, such as for example, thermal welding, ultrasonic binding, gluing, and taping.

The first reinforcing material 204 is positioned radially inward from the outer foil layer 202. The first reinforcing material 204 is configured to provide reinforcing support in a longitudinal direction of the liner 200. The first reinforcing material 204 may be configured in a variety of ways. For example, the type of and number of materials used for the first reinforcing material 204 may vary in different embodiments. Any material suitable for use in a CIPP liner and capable of providing longitudinal reinforcement to the liner 200 may be used. In some embodiments, the first reinforcing material 204 may be a plurality of reinforcing fibers or may include reinforcing fibers that are incorporated into another material, such as a fabric. Suitable first reinforcing materials 204 include, but are not limited to, one or more of glass fiber rovings, such as T-30 glass, glass fiber fabrics that may be woven, nonwoven, knitted, or stitched, glass fiber mats, or other reinforcing fibers, or materials that contains fibers. The reinforcement fibers may be any type of organic or synthetic fibers. In some exemplary embodiments, the reinforcement fibers include any one or more of glass, carbon, polyesters, polyolefins, nylons, aramids, poly(phenylene sulfide), polysulfone (PS), polyether sulfone (PES), polyacrilonitrile (PAN), silicon carbide (SiC), boron nitride, and the like. In some exemplary embodiments, the fabric (or layer) may be a hybrid fabric (or layer) including multiple different types of fibers.

In the exemplary embodiment, the first reinforcing material 204 includes a plurality of continuous glass fibers oriented in a longitudinal direction generally parallel to a longitudinal axis A of the liner 200. The glass fibers of the first reinforcing material 204 may be generally evenly distributed around the circumference of the liner 200. In other embodiments, however, the glass fibers of the first reinforcing material 204 may not be evenly distributed. The number of glass fibers of the first reinforcing material 204 may vary in different embodiments of the liner 200. For example, a liner 200 with a larger outer diameter OD may have more glass fibers than a liner with a smaller outer diameter OD.

The second reinforcing material 206 is positioned radially inward from the first reinforcing material 204. The second reinforcing material 206 is configured to provide reinforcing support in a radial direction of the liner 200. The second reinforcing material 206 may be configured in a variety of ways. For example, the type of and number of materials used for second reinforcing material 206 may vary in different embodiments. Any material suitable for use in a CIPP liner and capable of providing radial reinforcement to the liner 200 may be used. Suitable materials for the second reinforcing material 206 include, but are not limited to, one or more of glass fiber rovings, such as T-30 glass, glass fiber fabrics that may be woven, nonwoven, knitted, or stitched, glass fiber mats, or other reinforcing fibers, or materials that contains fibers.

The second reinforcing material 206 may include reinforcement fibers. The second reinforcing material 206 may include any type of fiber suitable for providing desired structural qualities. The reinforcement fibers may be any type of organic or synthetic fibers. In some exemplary embodiments, the reinforcement fibers include any one or more of glass, carbon, polyesters, polyolefins, nylons, aramids, poly(phenylene sulfide), polysulfone (PS), polyether sulfone (PES), polyacrilonitrile (PAN), silicon carbide (SiC), boron nitride, and the like. In some exemplary embodiments, the fabric (or layer) may be a hybrid fabric (or layer) including multiple different types of fibers.

In the exemplary embodiment, the second reinforcing material 206 includes sheets of oriented, continuous glass fibers. In other embodiments, however, the second reinforcing material 206 could be include non continuous fibers, tapes or cut fabrics or mat. The glass fibers are oriented in a direction perpendicular to, or nearly perpendicular to, the longitudinal axis A of the liner 200, thus providing radial reinforcement to the liner. In the exemplary embodiment, the formed liner 200 has continuous fibers oriented along the length of the liner and continuous fibers oriented substantially perpendicular to the length of the liner.

In the illustrated exemplary embodiment, the liner 200 includes a first layer 212 of the second reinforcing material layer 206 and a second layer 214 of the second reinforcing material 206. In other embodiments, however, the liner 200 may include more or less than two layers of the second reinforcing material 206. For example, the liner thickness T can be modified by changing the number of layers of the second reinforcing material 206. If a thicker liner 200 is desired, more layers of the second reinforcing material 206 can be used and vice versa.

As illustrated, the first layer 212 of the second reinforcing material 206 has a first edge portion 216 and a second edge portion 218 opposite the first edge portion 216. When the liner 200 is formed in the folding process, the first edge portion 216 overlaps the second edge portion 218 to allow the first and second edge portions 216, 218 to slide over each other. Due to the ability of the first and second edge portions 216, 218 to slide over each other, the liner 200 can expand to match the shape of the inner diameter of the pipe being rehabilitated.

Likewise, the second layer 214 of the second reinforcing material 206 has a first edge portion 220 and a second edge portion 222 opposite the first edge portion 220. When the liner 200 is formed in the folding process, the first edge portion 220 overlaps the second edge portion 222 to allow the first and second edge portions 220, 222 to slide over each other.

The inner foil layer 208 is configured to prevent leakage of resin and provide a smooth inner surface while. The inner foil layer 208 may also serve as a styrene barrier. Furthermore, in some embodiments, the inner foil layer 208 may be configured to allow UV light through the inner foil layer to cure the resin. The inner foil layer 208 may be configured in a variety of way. For example, the type of and number of materials used for the inner foil layer 208 may vary in different embodiments. Any material capable preventing leakage of resin, providing a smooth inner surface while, in some cases, allowing the UV light to cure the resins while providing a styrene vapor barrier may be used. Suitable materials for the inner foil layer 208 include, but are not limited to, one or more of a polyamide, polypropylene, polyethylene, polyurethane, or polyester. In the exemplary embodiment, the inner foil layer 208 and the outer foil layer 202 are the same material. In other embodiments, however, the inner foil layer 208 and the outer foil layer 202 may include different materials.

Figure 3:
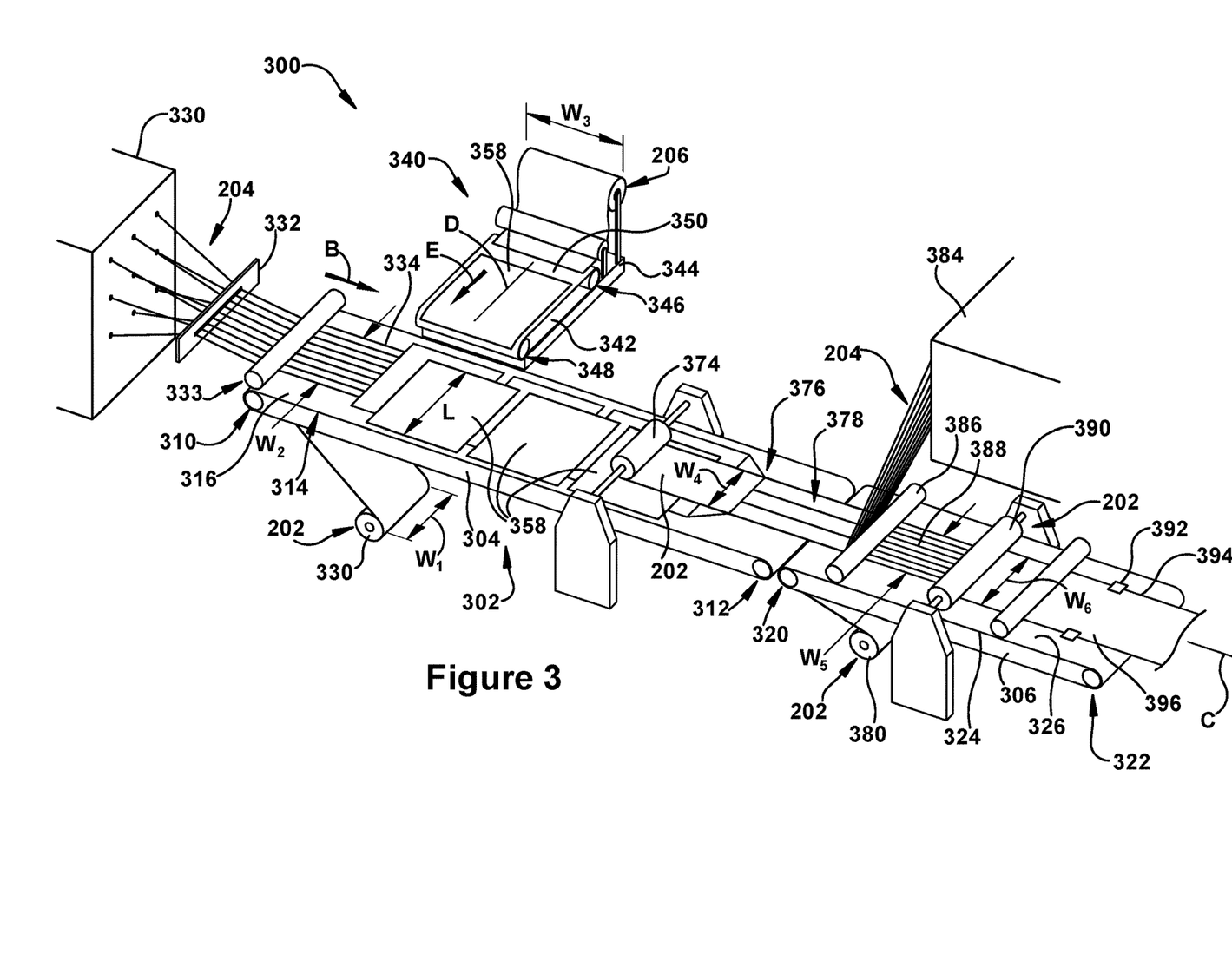
FIG. 3 is schematic representation of an exemplary embodiment of an apparatus for manufacturing a CIPP liner.

FIG. 3 illustrates an exemplary embodiment of an apparatus 300 for manufacturing the liner 200 for rehabilitating a pipe. The apparatus 300 includes a conveying system 302. The conveying system 302 can be configured in a variety of ways. Any system capable of supporting and moving the layers of material used to form the liner 200, such as for example, the outer and inner foil layers 202, 208, the first reinforcing material 204, and the second reinforcing material 206, may be used. The conveying system 302 may include, for example, one or more conventional belt conveyors. Any suitable conveyors, however, may be used. In the illustrated embodiment, the conveying system 302 includes a first conveyor 304 and a second conveyor 306. In some embodiments, the conveying system 302 may include more or less than two conveyors.

The first conveyor 304 has a first end 310, a second end 312, and a continuous belt 314 that moves along a top side 316 of the first conveyor 304 in a machine direction B. Similarly, the second conveyor 306 has a first end 320, a second end 322, and a continuous belt 324 that moves along a top side 326 of the second conveyor 306 in a machine direction B. In the exemplary embodiment, the first conveyor 304 and the second conveyor 306 are aligned end-to-end along a central longitudinal axis C such that the second end 312 of the first conveyor 304 is adjacent the first end 320 of the second conveyor 306. As a result, material being carried in the machine direction B on the top side 316 of the first conveyor 304 will be transferred onto the top side 326 of the second conveyor 306 and be carried in the machine direction B by the second conveyor 306.

The apparatus 300 may include a first roll 330 of continuous outer foil 202. The first roll 330 of continuous outer foil 202 is arranged proximate the first end 310 of the first conveyor 304 such that a layer of the outer foil 202 is fed or drawn onto the top side 316 of the first conveyor 304 and moved in the machine direction B. In the illustrated embodiment, the first roll 330 of continuous outer foil 202 is positioned below the first end 310 of the first conveyor 304. In other embodiments, however, the first roll 330 may be positioned in any suitable location to allow a layer of the outer foil 202 to be fed or drawn onto the top side 316 of the first conveyor 304. The layer of outer foil 202 on the top side 316 of the first conveyor 304 serves as the first half 209 of the outer foil layer 202 for the liner 200, as shown in FIG. 2. The first half 209 of the outer foil layer 202 has a width $W_1$.

The apparatus 300 may include a first supply of the first reinforcing material 204. The first supply of the first reinforcing material 204 may be configured in a variety of ways. Any configuration that allows a continuous supply of the first reinforcing material 204 to be arranged on the first conveyor 304 in a manner that provides longitudinal reinforcement to the liner 200 may be used. In the exemplary embodiment, the supply of the first reinforcing material 204 includes a creel 330 or rack of spools of glass fibers.

The creel 330 is arranged such that a plurality of glass fibers is drawn from the creel 330 through a fiber guide 332 and under a guide roller 333. The fiber guide 332 aligns the plurality of glass fibers into a planar layer of generally parallel fibers 334. The planar layer of generally parallel fibers 334 is deposited onto the outer foil 202 on the top side 316 of the first conveyor 304. The planar layer of generally parallel fibers 334 has a width $W_2$.

The apparatus 300 includes a movable side conveyor system 340. The movable side conveyor system 340 is designed to deposit layers of second reinforcing material 206 onto the first reinforcement material 204 at a predetermined and repeatable orientation. The movable conveyor system 340 may be configured in a variety of ways. Any configuration capable of depositing layers of second reinforcing material onto the first reinforcement material 204 at a predetermined and repeatable orientation may be used.

Figure 4:
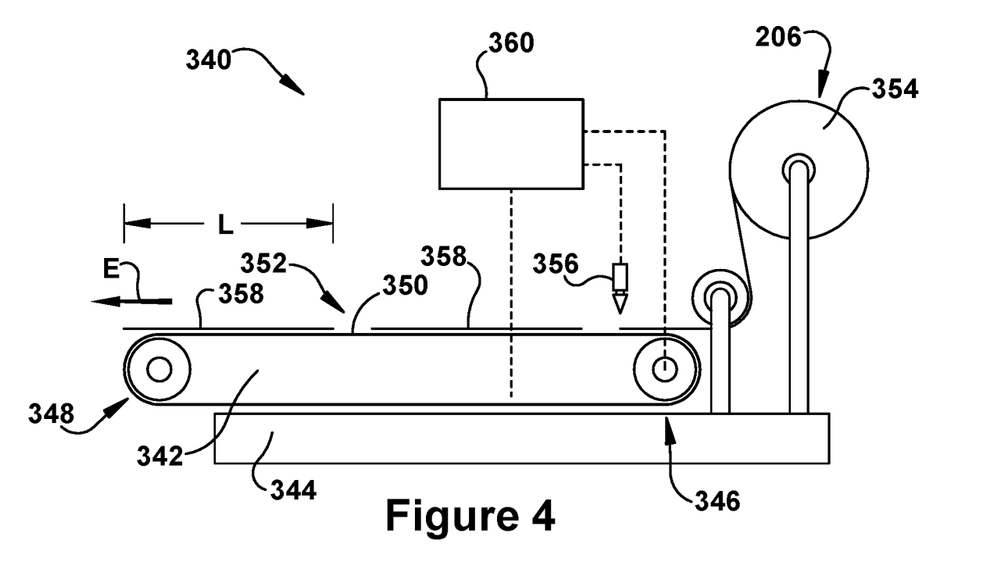
FIG. 4 is a schematic representation of an exemplary embodiment of a side conveying system of the apparatus of FIG. 3.

Referring to FIGS. 3 and 4, in the exemplary embodiment, the movable side conveyor system 340 includes a side conveyor 342 mounted on a movable carriage 344. The side conveyor 342 includes a first end 346, a second end 348, and a continuous belt 350 extending along a central longitudinal axis D (FIG. 3). The continuous belt 350 moves along a top side 352 of the side conveyor 342 in a machine direction E that is substantially parallel to central longitudinal axis D and substantially perpendicular to the machine direction B of the first conveyor 304, as shown in FIG. 3. The second end 348 of the side conveyor 342 is positioned such that material leaving the side conveyor 342 via the second end 348 will be placed on the top side 316 of the belt 314 of the first conveyor 304.

The movable side conveyor system 340 includes a roll 354, or other suitable supply, of continuous second reinforcing material 206 carried by the carriage 344. The roll 354 has a width $W_3$ (FIG. 3) and is positioned proximate the first end 346 of the side conveyor 342 such that the second reinforcing material 206 is drawn or fed onto the belt 350 and moved along the top side 352 of the side conveyor 342 in the machine direction E. In the illustrated embodiment, the roll 354 is positioned above the first end 346 of the side conveyor 342. In other embodiments, however, the roll 354 may be positioned in any suitable location to allow the second reinforcing material 206 to be drawn or fed onto the belt 350.

As indicated above, in the exemplary embodiment, the second reinforcing material 206 includes oriented, continuous glass fibers. The roll 354 of the second reinforcing material 206 is configured such that the glass fibers are oriented substantially parallel to the central longitudinal axis D and the machine direction E.

Referring to FIG. 4, the movable side conveyor system 340 includes a cutter 356. The cutter 356 is designed to cut the continuous second reinforcing material 206 into discrete sheets 358 of second reinforcing material 206 having a length L and can be programmed or configured to cut the continuous second reinforcing material 206 at a desired time and in a repeatable manner. The cutter 356 may be configured in a variety of ways. Any device capable of cutting the continuous second reinforcing material 206 into discrete lengths at a desired time and in a repeatable manner may be used.

In the exemplary embodiment, the cutter 356 includes a knife edge positioned proximate the first end 346 of the side conveyor 342. The cutter 356 may extend perpendicular across the entire width $W_3$ (FIG. 3) of the second reinforcing material 206 such that the entire width $W_3$ of the second reinforcing material 206 can be cut at the same time.

The cutter 356 may be controlled in any suitable manner. For example, a controller 360 may be programmed to control the operation of the side conveyor system 340. The controller 360 may, for example, be linked to one or more of the cutter 356, the side conveyor 342, and the movable carriage 344, and programmed to control the actuation of the cutter, the speed of the side conveyor, and the movement of the carriage. The controller 360, therefore, can actuate the cutter 356 at an appropriate time to create discrete sheets 358 of second reinforcing material 206, each having a predetermined length. Further, the controller 360 programming can be configured to readily modify the length L of the discrete sheets 358 of second reinforcing material 206 in order to produce a liner having a larger or smaller diameter. For example, the controller 360 can change when the cutter is actuated or change the speed of the side conveyor 342 to produce discrete sheets 358 having a different length L. In this manner, the controller and cutter arrangement may modify the length of the discrete sheets 358 based on the diameter of the liner being produced.

The movable carriage 344 can move the side conveyor 342 parallel to the central longitudinal axis C of the conveying system 302 while keeping the machine direction E substantially perpendicular to the machine direction B of the first conveyor 304. The movable carriage 344 can move parallel to the central longitudinal axis C of the conveying system 302 at a speed equal to the speed of the belt 314 of the first conveyor 304. In this manner, the discrete sheets 358 of second reinforcing material 206 exiting the side conveyor 342 via the second end 348 may be deposited onto the first conveyor 304 with the reinforcing fibers remaining substantially perpendicular to the fibers of the first reinforcing material 204.

Figure 5:
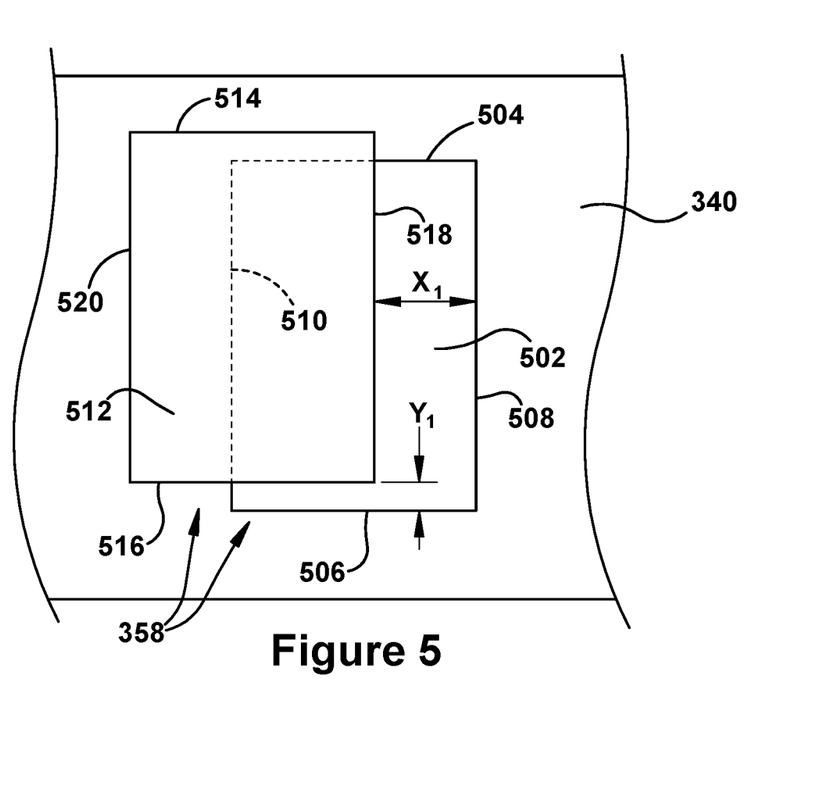
FIG. 5 is a partial top view of the material on the apparatus of FIG. 3.

As illustrated in FIGS. 3 and 5, the movable conveyor system 340 can deposit discrete sheets 358 onto the first conveyor 304 such that each of the plurality of discrete sheets 358 laterally overlaps, at least partially, one or more adjacent sheets of the plurality of sheets. For example, referring to FIG. 5, which illustrates only two of the plurality of discrete sheets 358 for simplicity, a first discrete sheet 502 of second reinforcing material includes a first edge portion 504, a second edge portion 506 substantially parallel to and opposite the first edge portion 504, a third edge portion 508 substantially perpendicular to and extending between the first edge portion 504 and the second edge portion 506, and a fourth edge portion 510 opposite the third edge portion 508 and substantially perpendicular to and extending between the first edge portion 504 and the second edge portion 506. Likewise, a second discrete sheet 512 of second reinforcing material includes a first edge portion 514, a second edge portion 516 substantially parallel to and opposite the first edge portion 514, a third edge portion 518 substantially perpendicular to and extending between the first edge portion 514 and the second edge portion 516, and a fourth edge portion 520 opposite the third edge portion 518 and substantially perpendicular to and extending between the first edge portion 514 and the second edge portion 516.

As shown in FIG. 5, the second discrete sheet 512 may be placed at least partially over top of the first discrete sheet 502 such that the third edge portion 518 of the second discrete sheet 512 is offset a distance $X_1$ from the third edge portion 508 of the first discrete sheet 502. In addition, the second discrete sheet 512 may be placed at least partially over top of the first discrete sheet 502 such that the second edge portion 516 of the second discrete sheet 512 is offset a distance $Y_1$ from the second edge portion 506 of the first discrete sheet 502. The distance $X_1$ and $Y_1$ can vary in different embodiments. For example, the offset distance $X_1$ may be smaller for thicker liners and larger for thinner liners.

Further, the distance $Y_1$ may be zero or may be adjusted for liners with different diameters. For example, the distance $Y_1$ may be larger for larger diameter liners.

In some exemplary embodiments, the apparatus 300 may include one or more additional movable side conveyor systems (not shown) similar to the side conveyor system 340. The one or more additional side conveyor systems may work cooperatively with the side conveyor system 340 to place discrete sheets 358 of the second reinforcing material 206 onto the first conveyor 304. For example, the side conveyor system 340 and an additional side conveyor system (not shown) may place alternating discrete sheets 358 of the second reinforcing material 206 onto the first conveyor 304.

An additional side conveyor system (not shown) may be placed next to the side conveyor system 340 on the same side of the first conveyor 304. Both side conveyor systems may be programmed to move in unison with each other. An additional side conveyor system (not shown) may also be placed on the opposite side of the first conveyor 304 as the first side conveyor system 340 and programmed to work cooperatively with the side conveyor system 340.

Referring to FIG. 3, the apparatus 300 may include a first roll 374 of continuous inner foil 208. The first roll 374 of continuous inner foil 208 is arranged downstream of the side conveyor 342 and rotatably supported above the center of the first conveyor 304. The first roll 374 of inner foil 208 is arranged such that a layer of the inner foil 208 is fed or drawn onto the top side 316 of the first conveyor 304 on top of the discrete sheets 358 of second reinforcing material 206 and is moved in the machine direction B. The inner foil 208 has a width $W_4$.

Proximate the second end 312 of the first conveyor 304 is a folding station 376. The folding station 376 is designed to fold the discrete sheets 358 of second reinforcing material 206 into a close-shaped configuration in which the edge portions of the discrete sheets overlap, such as for example, as discussed above regarding FIG. 2. The closed-shaped configuration may be, for example, a flattened, tube shape, or any shape resulting from the sheet being folded over upon itself such that opposing edges overlap to form a closed shape.

The folding station 376 can be configured in a variety of ways. Any apparatus or process capable of folding the discrete sheets 358 into a close-shaped configuration 378 may be used. For example, in some embodiments the folding process may be accomplished manually. In other embodiments, a folding mechanism (not shown) may be used to mechanically fold the edge portions of the discrete sheets in an overlapping manner.

In the illustrated embodiment, the first end 320 of the second conveyor 306 is positioned adjacent the second end 312 of the first conveyor 304. The use of the second conveyor 306 provides, for example, an alternate location for application of the first half 209 of the outer foil layer 202. In particular, similar to the first roll 330 of continuous outer foil 202 arranged adjacent the first end 310 of the first conveyor 304, an alternate roll 380 of continuous outer foil 202 may be positioned proximate the first end 320 of the second conveyor 306 such that a layer of the outer foil 202 is fed or drawn onto the top side 326 of the second conveyor 306 under the first and second reinforcement materials 204, 206 and moved in the machine direction B. In the illustrated embodiment, the alternate roll 380 of continuous outer foil 202 is positioned below the first end 320 of the second conveyor 306. In other embodiments, however, the alternate roll 380 may be positioned in any suitable location to allow a layer of the outer foil 202 is fed or drawn onto the top side 326.

The apparatus 300 may include a second supply of continuous first reinforcing material 204. The second supply of continuous first reinforcing material 204 may be configured in a variety of ways. Any configuration that allows a supply of continuous first reinforcing material 204 to be arranged on the folded configuration 378 of the second reinforcing material 206 in a manner that provides longitudinal reinforcement may be used. In the exemplary embodiment, the second supply of the first reinforcing material 204 is arranged substantially similarly to the first supply of first reinforcing material. The second supply includes a creel 384 or rack of spools of T-30 glass fibers.

The creel 384 is arranged such that a plurality of T-30 glass fibers is drawn from the creel 384 through a fiber guide (not shown) and under a guide roller 386. The fiber guide (not shown) aligns the plurality of T-30 glass fibers into a planar layer of generally parallel fibers 388. The planar layer of generally parallel fibers 388 are deposited onto the folded configuration 378 of the second reinforcing material 206. The planar layer of generally parallel fibers 388 has a width $W_5$.

The apparatus 300 may include a second roll 390 of continuous outer foil 202. The second roll 390 of continuous outer foil 202 is arranged above the top side 326 of the second conveyor 306 such that a layer of the outer foil 202 is fed or drawn onto the material on the top side 326 of the second conveyor 306 downstream of the creel 384 and moved in the machine direction B. The layer of outer foil 202 from the second roll 390 serves as the second half 210 of the outer foil layer 202 for the liner 200 (FIG. 2). The second half 210 of the outer foil layer 202 has a width $W_6$.

Proximate to the second roll 390 of continuous outer foil 202 is a sealing station 392. Referring to FIGS. 2 and 3, the sealing station 396 is designed to attach the first half 209 of the outer foil 202 to the second half 210 of the outer foil 202 along lateral edges 394, 396 of the liner 200. The sealing station 392 can be configured in a variety of ways. Any apparatus or process capable of attaching the first half 209 of the outer foil 202 to the second half 210 of the outer foil 202 along the lateral edges 394, 396 of the liner 200 may be used. The first half 209 of the outer foil 202 and the second half 210 of the outer foil 202 may be attached along the lateral edges 394, 396 in any suitable manner, such as for example, heat sealing, binding, taping, or gluing.

Figure 6:
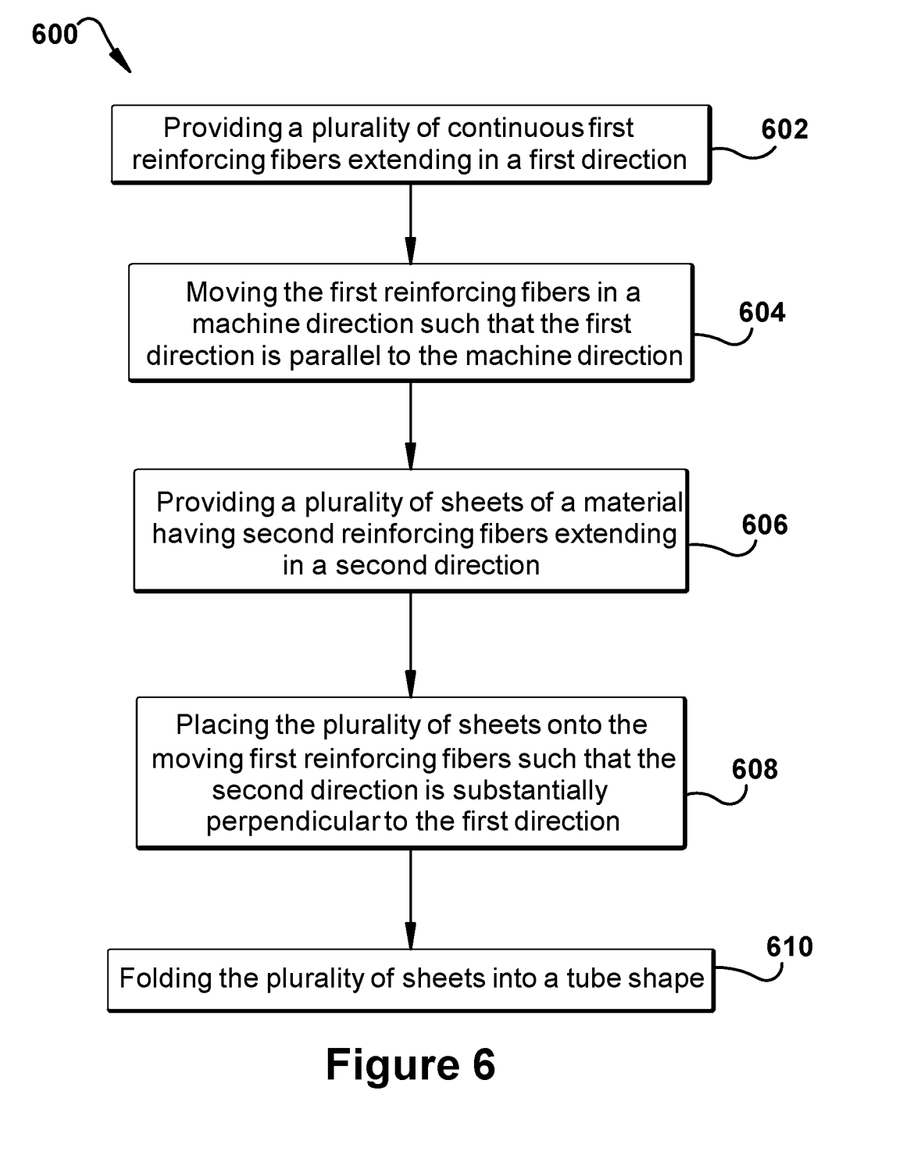
FIG. 6 is a flow chart of an exemplary embodiment of a process for manufacturing a CIPP liner with the apparatus of FIG. 3.

FIG. 6 illustrates a flow diagram of an exemplary method 600 of forming the liner 200. The exemplary method 600 is continuous, in that two or more continuous materials are combined to form a continuous liner. The method 600 includes providing a plurality of continuous first reinforcing fibers extending in a first direction 602 and moving the first reinforcing fibers in a machine direction such that the first direction is parallel to the machine direction 604. The method also includes providing a plurality of sheets of a material having second reinforcing fibers extending in a second direction 606. While the first material is moved in the machine direction, the plurality of sheets of a second material are placed onto the moving first reinforcing fibers such that the second direction is substantially perpendicular to the first direction 608. Each of the plurality of sheets may also partially overlap, in the machine direction, one or more adjacent sheet of the plurality of sheets.

After the plurality of sheets of a second material are placed onto the moving first reinforcing fibers, the plurality of sheets are folded into a closed shape 610. For example, the opposing longitudinal edges of each of the plurality of sheets of the second material are folded toward the center of each of the sheets such that the edges overlap forming a closed shape, such as a flattened tube. Referring to FIG. 5, as example, the first edge 506 and the second edge 504 of the first discrete sheet 502 are folded toward the center of each of the first discrete sheet 502 such that the edges overlap forming a closed shape. Thus, the discrete sheets are folded in, or parallel to the second direction.

Additional continuous first material having reinforcing fibers in a first direction may be provided and positioned on top of the closed shape. During the manufacturing process an inner foil layer may be positioned such that the inner foil layer forms the inner surface of the closed shape and an outer foil layer may be positioned such that the outer foil layer surrounds the first material and the second material.

Figure 7:
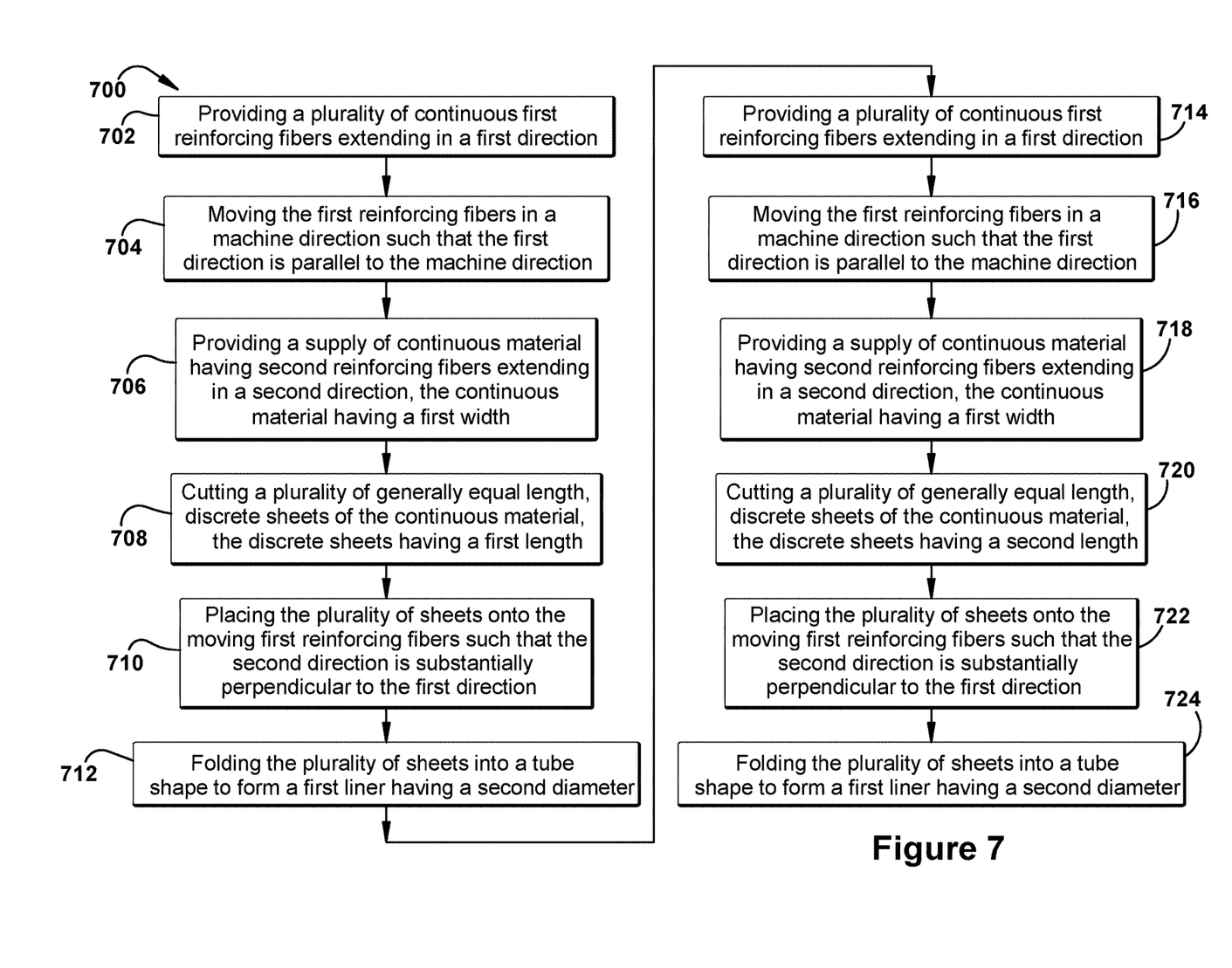
FIG. 7 is a flow chart of an exemplary embodiment of a process for manufacturing CIPP liners having different diameters with the apparatus of FIG. 3.

FIG. 7 illustrates a flow diagram of an exemplary method 700 of forming two or more liners having different diameters. The method 700 of FIG. 7 may be substantially similar to the method 600 of FIG. 6 to form a liner. However, to form a second liner having a different diameter than a first liner, the length of the discrete sheets of the second reinforcing material is changed. For example, to form a liner with a larger diameter or a smaller diameter than the first liner, the length of the discrete sheets of the second reinforcing material is increased or decreased, respectively. The exemplary method 700 is continuous, in that two or more continuous materials are combined to form a continuous liner.

In particular, the method 700 includes forming a first liner having a first diameter by providing a plurality of continuous first reinforcing fibers extending in a first direction 702 and moving the first reinforcing fibers in a machine direction such that the first direction is parallel to the machine direction 704. The method 700 also includes providing a supply of continuous material having second reinforcing fibers extending in a second direction, the continuous material having a first width 706. The supply of continuous material is then cut into a plurality of generally equal length, discrete sheets of the continuous material, the discrete sheets having a first length 708. While the first material is moved in the machine direction, the plurality of cut sheets of the second material are placed onto the moving first reinforcing fibers such that the second direction is substantially perpendicular to the first direction 710. Each of the plurality of sheets may also partially overlap, in the machine direction, one or more adjacent sheet of the plurality of sheets.

After the plurality of sheets of a second material are placed onto the moving first reinforcing fibers, the plurality of sheets are folded into a closed shape 712. For example, the opposing longitudinal edges of each of the plurality of sheets of the second material are folded toward the center of each of the sheets such that the edges overlap forming a closed shape, such as a flattened tube. Additional continuous first material having reinforcing fibers in a first direction may be provided and positioned on top of the closed shape. During the manufacturing process an inner foil layer may be positioned such that the inner foil layer forms the inner surface of the closed shape and an outer foil layer may be positioned such that the outer foil layer surrounds the first material and the second material.

To form a second liner having a second diameter, the steps are repeated but when the supply of continuous material is cut into a plurality of generally equal length, discrete sheets of the continuous material, the discrete sheets are cut to a second length that is different than the first length. In this way, when the discrete sheets having a second length are folded into a closed shape to form a liner, the liner will have a different diameter than the liner formed from the discrete sheets having a first length. Thus, the width of the discrete sheets is not changed to manufacture liners having different diameters. Instead, the length of the discrete sheets is adapted to provide the desired diameter for the liner once the material is folded.

In particular, the method 700 further includes forming a first liner having a second diameter by providing a plurality of continuous first reinforcing fibers extending in a first direction 714 and moving the first reinforcing fibers in a machine direction such that the first direction is parallel to the machine direction 716. The method 700 also includes providing a supply of continuous material having second reinforcing fibers extending in a second direction, the continuous material having a first width 718. The supply of continuous material is then cut into a plurality of generally equal length, discrete sheets of the continuous material, the discrete sheets having a second length 720. While the first material is moved in the machine direction, the plurality of cut sheets of the second material are placed onto the moving first reinforcing fibers such that the second direction is substantially perpendicular to the first direction 722. Each of the plurality of sheets may also partially overlap, in the machine direction, one or more adjacent sheet of the plurality of sheets. After the plurality of sheets of a second material are placed onto the moving first reinforcing fibers, the plurality of sheets are folded into a closed shape 724.

In some embodiments of the method, the widths $W_1$, $W_6$ of the outer foil layers, the widths $W_2$, $W_5$ of the planar layers of the first reinforcing fibers, and the width $W_4$ of the inner foil layer may also be modified when making a liner having a different diameter than the first liner. In other embodiments, however, the widths of the outer and inner foil layers and the planar layers of the first reinforcing fibers need not be modified.

Other Variations

Other variations of exemplary embodiments of the method and apparatus for manufacturing a liner for reinforcing a pipe are described below.

[A] A method of manufacturing a liner for reinforcing a pipe, the method comprising: providing a plurality of continuous first reinforcing fibers extending in a first direction; moving the first reinforcing fibers in a machine direction such that the first direction is parallel to the machine direction; providing a plurality of sheets of a material having second reinforcing fibers extending in a second direction; placing the plurality of sheets onto the moving first reinforcing fibers such that the second direction is substantially perpendicular to the first direction; and folding the plurality of sheets into a closed shape.

[B] The method of [A] wherein providing the plurality of sheets further comprises cutting a supply of continuous material having second reinforcing fibers into discrete sheets.

[C] The method of [B] wherein cutting the supply of continuous material having second reinforcing fibers into discrete sheets is performed proximate a conveyor that places the plurality of sheets onto the first reinforcing fibers.

[D] The method of [C] wherein the supply of continuous material having second reinforcing fibers and the conveyor are mounted on a movable carrier that is movable parallel to the machine direction.

[E] The method of [B or C] wherein the continuous material having second reinforcing fibers has a width, and wherein cutting the supply of continuous material having second reinforcing fibers into discrete sheets further comprises modifying the length of the discrete sheets based on the diameter of the liner being produced while maintaining the width of the continuous material.

[G] The method of any one of [A-E] wherein the continuous first reinforcing fibers are glass fibers.

[H] The method of anyone of [A-G] further comprising providing a plurality of continuous third reinforcing fibers extending in the first direction onto the folded plurality of sheets.

[I] The method of any one of [A-H] further comprising providing a continuous foil layer onto the plurality of sheets prior to folding the plurality of sheets.

[J] The method of any one of [A-I] wherein the second reinforcing fibers are oriented, continuous glass fibers.

[K] The method of any one of [A-J] wherein placing the plurality of sheets onto the moving first reinforcing fibers further comprises at least partially overlapping each of the plurality of sheets with one or more adjacent sheets of the plurality of sheets.

[L] The method of any one of [A-K] wherein placing the plurality of sheets onto the moving first reinforcing fibers further comprises moving the plurality of sheets onto the first reinforcing fibers with a conveyor while moving the conveyor in the machine direction.

[M] The method of any one of [L] wherein the first reinforcing fibers are moved at a first speed in the machine direction and the conveyor is moved at substantially the same speed.

[N] A method of manufacturing pipe-reinforcing liners having different diameters, the method comprising: (a) forming a first liner having a first diameter by: providing a layer of continuous first reinforcing fibers extending in a first direction; moving the first reinforcing fibers in a machine direction such that the first direction is parallel to the machine direction; providing a supply of continuous material having second reinforcing fibers extending in a second direction, the continuous material having a first width; cutting a plurality of equal length, discrete sheets of the continuous material, the discrete sheets having a first length; placing the plurality of sheets onto the moving first reinforcing fibers such that the second direction is substantially perpendicular to the first direction, wherein each of the plurality of sheets partially overlaps one or more adjacent sheets of the plurality of sheets; folding the plurality of sheets into a closed shape to form a first liner having a first diameter; and (b) forming a second liner having a second diameter by: providing a layer of continuous first reinforcing fibers extending in a first direction; moving the first reinforcing fibers in a machine direction such that the first direction is parallel to the machine direction; providing a supply of continuous material having second reinforcing fibers extending in a second direction, the continuous material having the first width; cutting a plurality of equal length, discrete sheets of the continuous material, the discrete sheets having a second length different than the first length; placing the plurality of sheets onto the moving first reinforcing fibers such that the second direction is substantially perpendicular to the first direction; and folding the plurality of sheets into a closed shape to form a second liner having a second diameter.

[O] The method of [N] wherein cutting a plurality of equal length, discrete sheets of the continuous material is performed proximate a conveyor that places the plurality of sheets onto the first reinforcing fibers.

[P] The method of claim [O] wherein the supply of continuous material having second reinforcing fibers and the conveyor are mounted on a movable carrier that is movable parallel to the machine direction.

[Q] The method of [P] further comprising a cutter that cuts the continuous material having second reinforcing fibers into a plurality of equal length, discrete sheets, wherein the cutter is mounted on the movable carrier.

[R] The method of any one of [N-Q] wherein the continuous first reinforcing fibers are glass fibers.

[S] The method of any one of [N-R] further comprising providing a continuous foil layer onto the plurality of sheets prior to folding the plurality of sheets.

[T] The method of any one of [N-S] wherein the second reinforcing fibers are oriented, continuous glass fibers.

[U] The method of any one of [N-T] wherein placing the plurality of sheets onto the moving first reinforcing fibers further comprises at least partially overlapping each of the plurality of sheets with one or more adjacent sheets of the plurality of sheets.

[V] The method of any one of [N-U] wherein placing the plurality of sheets onto the moving first reinforcing fibers further comprises moving the plurality of sheets onto the first reinforcing fibers with a conveyor and moving the conveyor in the machine direction while placing the plurality of sheets onto the moving first reinforcing fibers.

[W] The method of any one of [N-V] wherein the first reinforcing fibers are moved at a first speed in the machine direction and the conveyor is moved at substantially the same speed.

[X] An apparatus for manufacturing a liner for reinforcing a pipe, the apparatus comprising: a supply of continuous first reinforcing fibers for being moved in a first machine direction; a first conveyor having a conveyor belt capable of moving the continuous first reinforcing fibers in the first machine direction; a side conveyor system movable relative to the first conveyor, the side conveyor system comprising: a supply of continuous second reinforcing material having second reinforcing fibers extending in a second machine direction that is perpendicular to the first machine direction; a side conveyor having a conveyor belt that is capable of moving the second reinforcing material in the second machine direction; and a cutter that cuts the continuous second reinforcing material into discrete sheets of second reinforcing material, wherein the side conveyor is operable to place the discrete sheets onto the continuous first reinforcing material on the first conveyor such that the second reinforcing fibers are substantially perpendicular to the first reinforcing fibers.

[Y] The apparatus of [X] wherein the side conveyor system moves in the first machine direction while placing the plurality of sheets onto the moving first reinforcing fibers.

[Z] The apparatus of [Y] wherein the first conveyor moves the first reinforcing fibers at a first speed in the first machine direction and the side conveyor system moves in the machine direction at substantially the same speed.

[AA] The apparatus any one of [X-Z] wherein the continuous first reinforcing fibers are glass fibers.

[BB] The apparatus of any one of [X-AA] further comprising a folding station for folding the plurality of sheets into a closed shape.

[CC] The apparatus of any one of [X-BB] further comprising a second supply of continuous first reinforcing fibers extending in a first machine direction, the second supply positioned to place continuous first reinforcing fibers onto the plurality of sheets after the sheets are folded into the closed shape.

[DD] The apparatus of any one of [X-CC] further comprising a controller that controls the side conveyor system, the controller adapted to modify the length of the discrete sheets based on the diameter of the liner being produced.

While various inventive aspects, concepts, and features of the general inventive concepts are described and illustrated herein in the context of various exemplary embodiments, these various aspects, concepts, and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts, and features of the inventions (such as alternative materials, structures, configurations, methods, circuits, devices and components, software, hardware, control logic, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the general inventive concepts even if such embodiments are not expressly disclosed herein. Additionally, even though some aspects, concepts, or features of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, concepts, and features may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A method of manufacturing a liner for reinforcing a pipe, the method comprising:
   providing a plurality of continuous first reinforcing fibers extending in a first direction;
   moving the first reinforcing fibers in a machine direction such that the first direction is parallel to the machine direction;
   providing a plurality of sheets of a material having second reinforcing fibers extending in a second direction;
   placing the plurality of sheets onto the moving first reinforcing fibers such that the second direction is substantially perpendicular to the first direction; and
   folding the plurality of sheets into a closed shape to form the liner.

2. The method of claim 1, wherein providing the plurality of sheets further comprises cutting a supply of continuous material having second reinforcing fibers into discrete sheets.

3. The method of claim 2, wherein cutting the supply of continuous material having second reinforcing fibers into discrete sheets is performed proximate a conveyor that places the plurality of sheets onto the first reinforcing fibers.

4. The method of claim 3, wherein the supply of continuous material having second reinforcing fibers and the conveyor are mounted on a movable carrier that is movable parallel to the machine direction.

5. The method of claim 2, wherein the continuous material having second reinforcing fibers has a width, and wherein cutting the supply of continuous material having second reinforcing fibers into discrete sheets further comprises modifying a length of the discrete sheets based on a desired diameter of the liner while maintaining the width of the continuous material.

6. The method of claim 1, wherein the continuous first reinforcing fibers are glass fibers.

7. The method of claim 1, further comprising providing a plurality of continuous third reinforcing fibers extending in the first direction onto the folded plurality of sheets.

8. The method of claim 1, further comprising providing a continuous foil layer onto the plurality of sheets prior to folding the plurality of sheets.

9. The method of claim 1, wherein the second reinforcing fibers are oriented, continuous glass fibers.

10. The method of claim 1, wherein placing the plurality of sheets onto the moving first reinforcing fibers further comprises at least partially overlapping each of the plurality of sheets with one or more adjacent sheets of the plurality of sheets.

11. The method of claim 1, wherein placing the plurality of sheets onto the moving first reinforcing fibers further comprises moving the plurality of sheets onto the first reinforcing fibers with a conveyor while moving the conveyor in the machine direction.

12. The method of claim 11, wherein the first reinforcing fibers are moved at a first speed in the machine direction and the conveyor is moved at substantially the same speed.

13. A method of manufacturing pipe-reinforcing liners having different diameters, the method comprising:
   (a) forming a first liner having a first diameter by:
      providing a first layer of continuous first reinforcing fibers extending in a first direction;
      moving the first layer of first reinforcing fibers in a machine direction such that the first direction is parallel to the machine direction;
      providing a supply of continuous material having second reinforcing fibers extending in a second direction, the continuous material having a first width;
      cutting a first plurality of equal length, discrete sheets of the continuous material, the first plurality of discrete sheets having a first length;
      placing the first plurality of sheets onto the moving first layer of first reinforcing fibers such that the second direction is substantially perpendicular to the first direction, wherein each of the first plurality of sheets partially overlaps one or more adjacent sheets of the first plurality of sheets;
      folding the first plurality of sheets into a closed shape to form the first liner having the first diameter; and
   (b) forming a second liner having a second diameter by:
      providing a second layer of the continuous first reinforcing fibers extending in the first direction;
      moving the second layer of first reinforcing fibers in the machine direction parallel to the first direction;
      cutting a second plurality of equal length, discrete sheets of the continuous material having the second reinforcing fibers extending in the second direction, the second plurality of discrete sheets having a second length different than the first length;

placing the second plurality of sheets onto the moving second layer of first reinforcing fibers such that the second direction is substantially perpendicular to the first direction; and folding the second plurality of sheets into a closed shape to form the second liner having the second diameter.

14. The method of claim 13, wherein cutting the first plurality of equal length, discrete sheets of the continuous material is performed proximate a conveyor that places the first plurality of sheets onto the first layer of first reinforcing fibers.

15. The method of claim 14, wherein the supply of continuous material having second reinforcing fibers and the conveyor are mounted on a movable carrier that is movable parallel to the machine direction.

16. The method of claim 15, wherein cutting the continuous material having second reinforcing fibers into the first plurality of equal length, discrete sheets, further comprises cutting the continuous material with a cutter mounted on the movable carrier.

17. The method of claim 13, wherein the first layer of continuous first reinforcing fibers are glass fibers.

18. The method of claim 13, further comprising providing a continuous foil layer onto the first plurality of sheets prior to folding the first plurality of sheets.

19. The method of claim 13, wherein the second reinforcing fibers are oriented, continuous glass fibers.

20. The method of claim 13, wherein placing the second plurality of sheets onto the moving second layer of first reinforcing fibers further comprises at least partially overlapping each of the second plurality of sheets with one or more adjacent sheets of the second plurality of sheets.

21. The method of claim 13, wherein placing the first plurality of sheets onto the moving first layer of first reinforcing fibers further comprises moving the first plurality of sheets onto the first layer of first reinforcing fibers with a conveyor and moving the conveyor in the machine direction while placing the first plurality of sheets onto the moving first layer of first reinforcing fibers.

22. The method of claim 21, wherein the first layer of first reinforcing fibers is moved at a first speed in the machine direction and the conveyor is moved at substantially the same speed.

* * * * *